July 10, 1956
E. C. STEINBACH
2,754,080
DETACHABLE MOUNTING MEANS
Filed Aug. 11, 1953
2 Sheets-Sheet 1
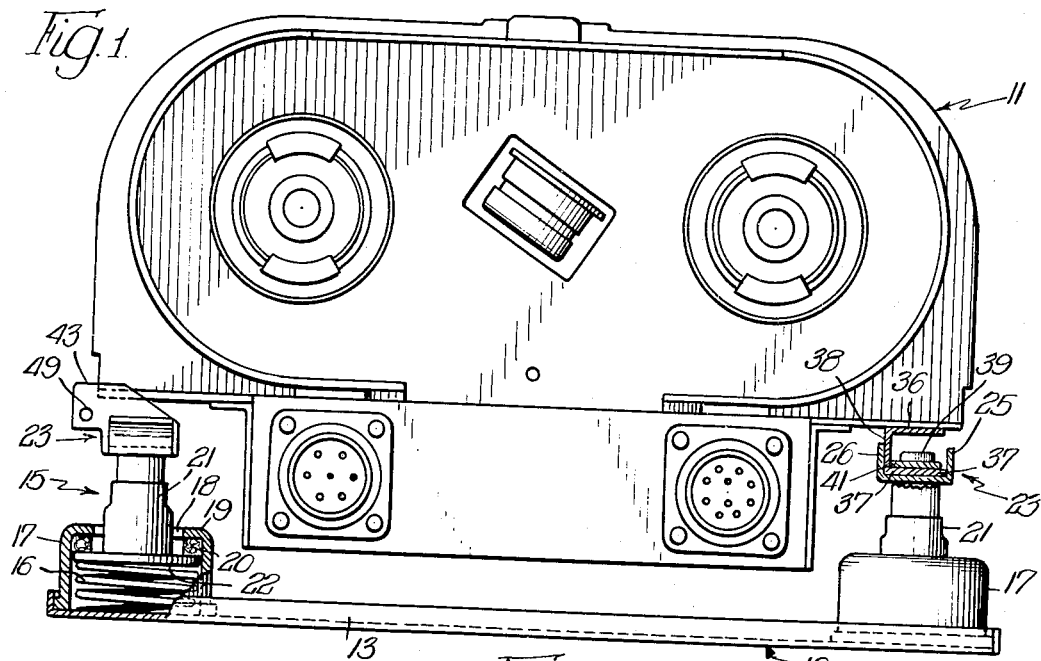
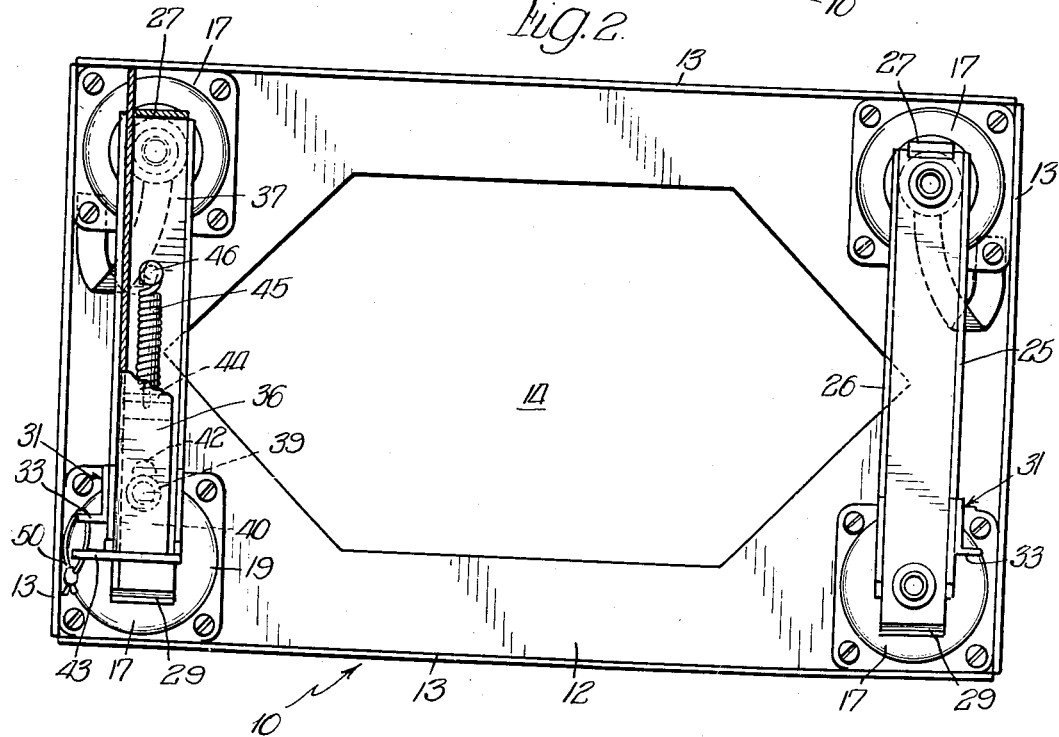
INVENTOR.
Emil C. Steinbach,
BY
ATTYS.

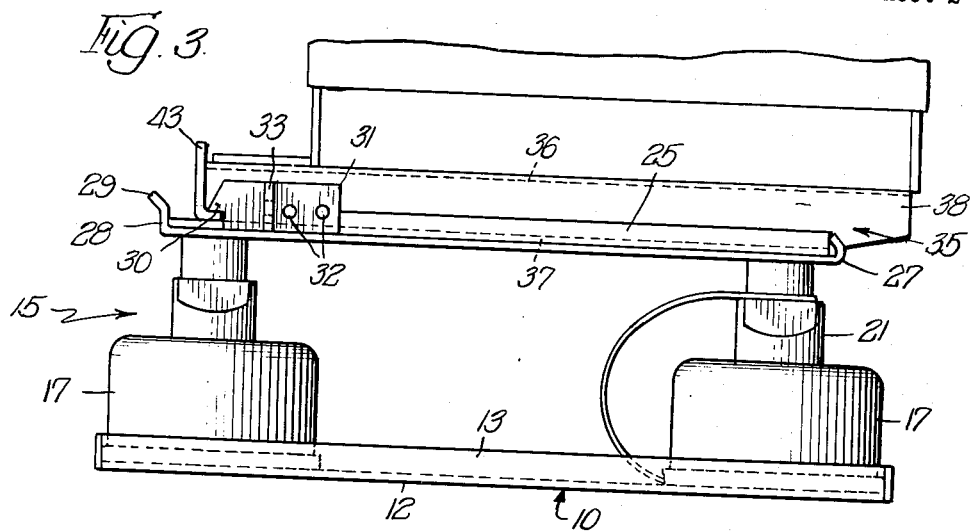
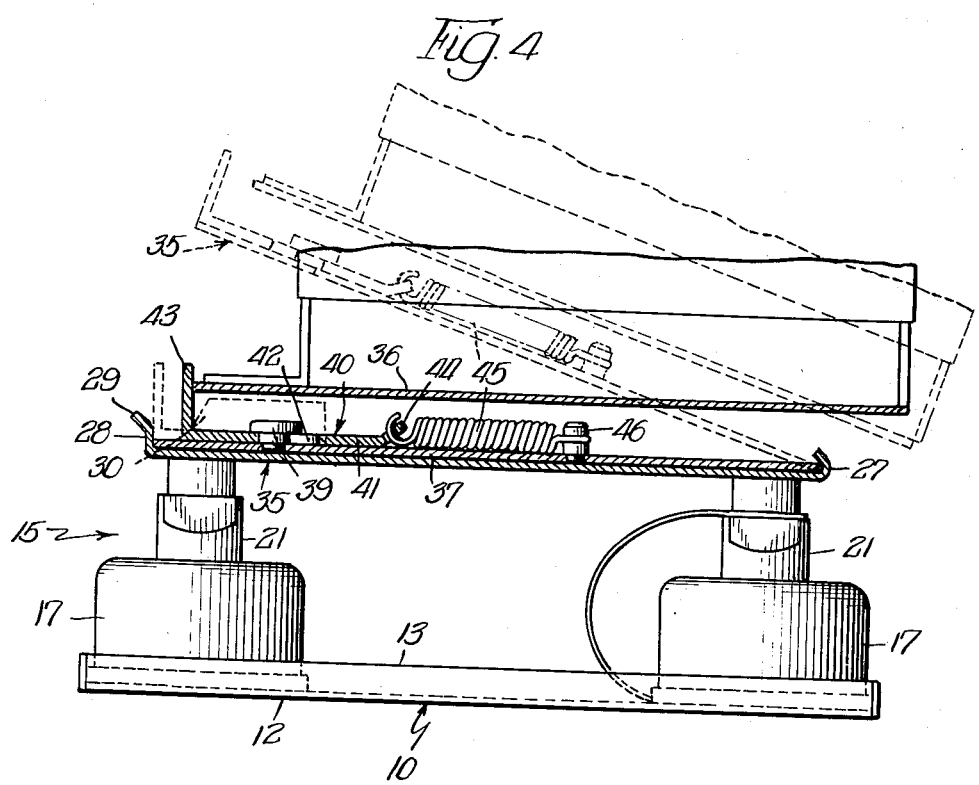

United States Patent Office 2,754,080
Patented July 10, 1956

2,754,080

DETACHABLE MOUNTING MEANS

Emil C. Steinbach, Chicago, Ill., assignor to Charles P. Peirce, Wilmette, Ill.

Application August 11, 1953, Serial No. 373,561

1 Claim. (Cl. 248—350)

This invention relates to mounting means or carriage systems and more particularly to a new and improved detachable mounting means having a special adaptation for air borne equipment and the like.

The particular field to which my present invention relates concerns specifically air borne wire recorders or like equipment and a new and improved quick-acting detachable mounting means therefor. In the course of air operations, experience has shown that the installation of such equipment is best carried out by providing means for its ready detachment from a mounting base. Thus when the equipment needs repair the same can be removed as a unit by quick detachment from its mounting and sent to a central repair station for necessary attention. Conversely replacement of such damaged gear can be made immediately by inserting a new unit of equipment onto the standard mounting carriage or base which remains in the aircraft.

Briefly, the invention of subject comprises a pair of parallel spaced carriage bars suitably supported on shock absorbing pedestals and which cooperate with members carried by the particular unit of equipment for which the same is designed; such members on the equipment being received in the parallel spaced carriage bars and connecting thereto by means of a quick acting spring loaded connector means.

The exact details and features of my invention will be understood more fully from the description and specifications therefor which are to be found hereinafter and with reference to the illustration of a preferred embodiment of its concepts as found in the accompanying drawings.

In the drawings:

Figure 1 is a front elevational view demonstrating the utility of my improved mounting means for supporting a typical air borne wire recorder or like piece of equipment;

Figure 2 is a top plan view of my improved mounting means shown with the wire recorder of Figure 1 removed;

Figure 3 is an end elevational view of the improved mounting means of my invention, showing the cooperation between the elemental portions thereof carried by the air borne equipment, as for example the wire recorder of Figure 1, and the shock absorbing base carriage portion thereof; and Figure 4 is an end elevational view, similar to Figure 1, with parts in cross-section showing the mode of operating my mounting means for disassociating the air borne wire recorder unit from my improved mounting means.

Turning now to the features of the improved mounting means of my invention as illustrated in the drawings, it will be recognized from Figures 1 and 2 in particular, that the same is indicated generally by numeral 10 in Figure 1 and is arranged to carry a piece of air borne equipment, for example an air borne wire recorder shown at 11. My improved mounting means particularly includes a base plate 12 which is formed as a substantially rectangular metal base plate having beaded edges 13 and a cut-out portion 14 substantially at its central area for the sake of lightness. At each of the four corners of base plate are disposed shock absorbing pedestal assemblies 15. Each assembly 15 includes a coil spring 16 carried within an inverted cup shaped member 17 having an opening 18 centrally of its upper wall 19. An annulus 20 of cushioning material, for example steel wool is provided against the inside face of wall 19 and bordering opening 18 therein. A post member 21 having an enlarged circular disc or flange portion 22 at its lower end, rides coaxially of cup 17 and between the upper end of spring 16 and the cushioning annulus 20. The upper end of post 21 connects rigidly to one of two parallel spaced carriage channels 23, 23 of my mounting means. The particular form of shock absorbing pedestal hereinabove described and illustrated in the drawings is commercially available and does not constitute any part of my present invention other than as an element in its overall combination and can be readily replaced with any suitable type of shock absorbing mounting pedestal designed to carry out the purposes and intentions required. Each of such pedestals 15 however, is fastened as by rivet members to the base plate 12 inwardly of the rolled over or upwardly turned beaded edge portions 13 thereof.

As particularly seen in Figures 2, 3 and 4 of the drawings, the carriage channels 23 each comprise an elongated member substantially U-shaped in cross section and having a base wall 24, and side walls 25 and 26; such channel members being connected adjacent their ends, as by riveting or any other suitable connective means of that nature, to and between two of the underlying shock absorbing pedestal assemblies 15, so that one carriage channel member is disposed substantially across each end of the rectangular base plate 12. The rearward end of each of the carriage members 23 is reentrantly turned upwardly of base wall 24, as at 27 to form a detent, the purpose and utility of which will be understood from description which appears later herein. The forward or opposite end of each of the carriage members also is turned upwardly to form a substantially planar front wall portion 28 angled outwardly to provide a guiding lip portion 29.

The side walls 25 and 26 are suitably cut away at an angle adjacent front wall 28 to provide a clearance space or notch-out distinguished by a hook element 30. Tab members 31, 31 are mounted on the outside side wall 25 of each of the channel members and immediately adjacent the hook element 31 thereof; such being fastened to the wall 25 as by spot welds 32 or the like and provided with an outwardly turned ear portion 33 thereof which is apertured and the purpose of which will be explained later hereinafter.

From the drawings and above description it will be recognized and understood that both of the carriage channel members 23 are identical in formation and may be suitably formed as by a stamping operation from a rigid material, as for example, sheet metal.

Adjacent opposite ends of the wire recorder unit 11 and secured to the underside thereof are a pair of like channel bar members 35, 35 which fit within and cooperate with the carriage channel members 23, 23 in the mounting operation of my assembly. Each of the bar members 35 is formed substantially C shaped having a top wall 36, bottom wall 37 and one side wall 38 the same being open on its forth side (see Figure 1). Through the bottom wall 37 of such channel bars a slide rivet member 39 is inserted and affixed. Over such slide rivet is mounted a slide latch 40, best seen in Figures 2 and 4, which comprises a metal member having a base portion 41 in which a slotted aperture 42 is formed for receiving rivet 39. One end of each latch is formed with a vertical wall portion 43 which extends laterally beyond the side walls 25 and 26 of the carriage channel member 23 when assembled therewith. The other or inner end of each latch is angled upwardly as at 44 to form an inclined wall to which one end of a tension coil spring member 45 is attached; the opposite end of said spring being secured to an upright stud member 46 riveted or otherwise rigidly fastened to the bottom wall or base 37 of the channel bar 35. Each slide latch is widened at one end by portions 48, formed immediately adjacent the vertical wall 43 thereof to extend laterally beyond side walls 25 and 26 of the associated carriage channel and at the cut away portion therein. Such portions 48 engage beneath the hook elements 30 of the carriage bars.

The two channel bars 35 are each secured to the underside of the wire recording unit, as by machine screws or like fasteners, and as will be appreciated, are thus carried with the wire recorder unit. It will also be seen from Figures 3 and 4 particularly that the bottom wall 37 of each channel bar 35 is cut away or foreshortened at the rearward end thereof adjacent the back side of the recorder unit, while side walls 38 slope upwardly from the rearward ends of walls 37. The bottom walls 37 are thus accommodated to engage beneath the detents 27 of the carriage members when mounting the recorder unit thereon.

Having thus described the elements which comprise the features and make-up of my invention, its operation and utility will now be set forth. From an inspection of the Figures 3 and 4, it will be seen that mounting of the wire recorder unit 11 on the carriage channels 23 is accomplished by laying the two channel bars 35 carried by the wire recorder coextensively within the channels 23. Simultaneously the rearward edge of each channel bar's bottom wall 37 is fitted beneath the reentrantly turned end wall or detent 27 of the carriage members. The wire recorder is then lowered from its dotted line position, shown in Figure 4, to its full line position of Figures 3 and 4, such action causing the sloping forward edges of carriage side walls 25 and 26 to bias the sliding latch members 40 against the tension of spring members 45 until the same pass the apex of the hook elements 30 and lock the widened portions 48 beneath such hooks with a snap action. Removal of the unit 11 from the underlying carriage assembly is affected quite simple by pulling outwardly on the latch members 40 so as to disengage the wall portions 48 of the latches from beneath the hook elements 30.

It will also be noted that walls 43 of the latch members are apertured at 49 and in registration with like openings in the ear portions 33 of tabs 31. This system provides a convenient means for locking the latch and carriage channels of the mounting means together by a seal 50 or the like.

Having thus described the features and operation of my new and improved mounting means, it will be understood that numerous changes, modifications and substitutions of equivalents may be resorted to therein without departing from its spirit and scope. As a consequence, I do not intend to be limited to the specific form of my invention herein illustrated and described except as may appear in the following appended claim.

I claim:

A mounting means of the class described for detachably securing an air borne radio unit or the like to an underlying support, comprising, a support base, a pair of carriage members each formed as an elongated metal channel of substantially U-shaped cross-section having a bottom wall and two side walls extended upwardly therefrom, a reentrantly turned lip portion at one end of said bottom wall forming a detent, means supporting said carriage members in spaced parallelism at opposite ends of the support base, a pair of bar members attachable to opposite ends of a unit to be secured by the mounting means and each nested in one of said carriage members, each of said bar members being engaged at one end by the detent means associated with its respective carriage member, a sliding latch means mounted on the other end of each of said bar members for rectilinear reciprocation relative thereto, spring means normally biasing said latch means toward said one end of its related bar member, a widened portion formed at one end of each latch means, such widened portion extending beyond the lateral limits of its associated bar member, openings formed in the side walls of each carriage member adjacent the end thereof remote from said detent means thereon, a notch forming a hook element projecting inwardly of the periphery of each of said openings, said widened portion being releasably engaged in said notch, whereby the nesting of said bar members in said carriage members permits locking engagement of said one end thereof with said detent means and the engagement of the widened portions of the latch means beneath said hook elements.

References Cited in the file of this patent

UNITED STATES PATENTS

| | | |
|---|---|---|
| D. 131,157 | Drake et al. | Jan. 20, 1942 |
| 1,407,395 | Emerson | Feb. 21, 1922 |
| 2,131,647 | Strege | Sept. 27, 1938 |
| 2,357,120 | Kuebert et al. | Aug. 29, 1944 |
| 2,376,280 | Schonert et al. | May 15, 1945 |
| 2,433,509 | Drescher | Dec. 30, 1947 |
| 2,441,509 | Robinson | May 11, 1948 |
| 2,544,778 | Cuthbertson | Mar. 13, 1951 |

FOREIGN PATENTS

| | | |
|---|---|---|
| 227,679 | Switzerland | Sept. 16, 1943 |